United States Patent [19]

Anderson et al.

[11] Patent Number: 5,311,484
[45] Date of Patent: May 10, 1994

[54] METHOD AND APPARATUS FOR PETROLEUM AND GAS EXPLORATION

[75] Inventors: Roger N. Anderson, New York, N.Y.; Wei He, Closter, N.J.

[73] Assignee: The Trustees of Columbia University in the City of New York, New York, N.Y.

[21] Appl. No.: 736,682

[22] Filed: Jul. 26, 1991

[51] Int. Cl.$^5$ .......................... G01V 1/00; G01V 1/28
[52] U.S. Cl. ..................................... 367/38; 367/37; 367/47
[58] Field of Search ..................... 364/421; 367/37, 38, 367/47, 49, 59, 73; 73/154

[56] References Cited

U.S. PATENT DOCUMENTS 3,898,610  8/1975  Pennebaker, Jr. ..................... 367/38
4,676,664  6/1987  Anderson et al. ..................... 73/154

OTHER PUBLICATIONS

Pfeiffer et al., "Subsurface Temperature Distributions in S. Texas", 39th Ann. Gulf Coast Ass. Geol Soc and 36th Ann. Symp. Gulf Coast Sect. Mtg. (Corpus Christi, Oct. 1989) Trans v 39, pp. 231-245.
M. T. Taner, F. Koehler, and R. E. Sheriff, "Complex Seismic Trace Analysis," Geophysics, vol. 44, No. 6, (Jun. 1979), pp. 1041-1063.
M. T. Taner and R. E. sheriff, "Application of Amplitude, Frequency, and Other Attributes to Stratigraphic and Hydrocarbon Determination," Seismic Stratigraphy–Applications to Hydrocarbon Exploration: C. E. Payton, Ed., Am. Assoc. of Petr. Geol., Memoir 26, Tulsa, (1977), pp. 301-327.
R. E. Sheriff, M. T. Taner, F. Koehler, D. Frye, "Extraction and Interpretation of the Complex Seismic Trace," *Proceedings of the Sixth Annual Conventional of the Indonesian Petroleum Association,* May 1977, pp. 305-316.
R. E. Sheriff, M. T. Taner and Kris Rao, "Seismic Attribute Measurements in Offshore Production," OTC 3174, 10th Annual Ocean Technology Conference, Houston, Tex., May 8-11, 1978, pp. 1103-1108.
S. Mastoris, "3D Seismic Interpretation Techniques Define Shallow Gas Sand Reservoirs," *Oil & Gas Journal,* Jan. 9, 1989, pp. 69-73.
J. S. Farnbach, "The Complex Envelope in Seismic Signal Analysis," Bulletin of the Seismological Society of America, vol. 65, No. 4, Aug. 1975, pp. 951-962.
D. W. Frye and B. B. Crow, "Improving the Odds in Your Offshore Development Program," OTC 2441,
(List continued on next page.)

*Primary Examiner*—Ian J. Lobo
*Attorney, Agent, or Firm*—Brumbaugh, Graves, Donohue & Raymond

[57] ABSTRACT

In the exploration for petroleum or natural gas, drilling targets are identified by locating local maxima of horizontal gradient in the top-of-geopressure surface of a region of exploration. The probability of finding hydrocarbon deposits is significantly improved where the drilling targets are local maxima of the horizontal gradient in the top-of-geopressure surface which coincide with local maxima of subsurface heat flow in the region of exploration, particularly where the local maxima in the horizontal gradient of the top-of-geopressured surface is concentrated across major fault offsets and are parallel to the predominant strike directions of the faults. The top-of-geopressure surface may be remotely sensed by performing complex trace analysis on reflection seismic traces gathered for the region of exploration to derive corresponding reflection strength attribute traces. The corresponding reflection strength traces are first smoothed and then subject to further complex trace analysis to derive the envelope amplitudes of the smoothed reflection strength traces, which are referred to as second reflection strength traces. The second reflection strength traces are then analyzed to locate an uppermost distinct subsurface boundary between high and low amplitude components thereof. Such a distinct boundary is then identified as the top-of-geopressure surface for the region of exploration.

23 Claims, 9 Drawing Sheets

Microfiche Appendix Included
(38 Microfiche, 1 Pages)

1300

OTHER PUBLICATIONS

Offshore Technology Conference, Dallas, Tex., 1976, pp. 197-200.

T. K. Kan and R. M. Slatt, "Relation of Physical and Seismic Properties of Gulf Coast Shale," *Proceedings of the Annual Convention and Exposition of the American Association of Petroleum Geologists*, Jun. 3-6 1990, San Francisco, Calif.

D. J. Taylor and R. Q. Foote, "Detection of Geopressured Zones by Seismic-Reflection Method," Geological Survey Professional Paper, vol. 1375, (1982-1983), p. 32.

J. H. Seo, *Detecting Abnormal Geopressure Using Seismic Reflectivity*, Masters Thesis, University of Texas, Austin, (1978).

J. D. Robertson, H. H. Nogami, *Complex Trace Analysis of Thin Beds Geophysics*, vol. 49, No. 4, Apr. 1989, pp. 344-352.

J. D. Robetson, H. H. Nogami, *Thin Bed Stratigraphy Form Complex Trace Attributes, AAPG Bulletin, vol. 60 No. 5, p. 624 (1982)*.

J. G. Saha, N. D. J. Rao, M. C. Agrawal On: "Complex Tract Analysis: by M. T. Taner, F. Koehler, and R. E. Sheriff" (Geophysics Jun. 1979, pp. 1041-1063), letter, Geophysics vol. 45 No. 12 1877-1878 (1980).

M. T. Taner, F. Koehler, R. E. Sheriff, Reply by Author to J. G. Saha, N. D. J. Rao, and M. C. Agrawal, letter, Geophysics vol. 45 No. 12, pp. 1877-1878 (1980).

A. E. Barnes, *Amplitude and Frequency Analysis of CO-CORP Deep Seismic Reflection Data*, abstract, Dissertation Abstracts International, vol. 51, No. 9, Mar. 1991.

F. Koehler, M. T. Taner, R. E. Sheriff and D. Frye, *Extraction and Interpretation of the Complex Seismic Trace: Part I, Computational Procedures*, abstract, abstract of papers Zagreb meeting, Geophysics Prospect, vol. 25, No. 3, p. 585 (1977).

R. E. Sheriff, D. Frye, F. Koehler, and M. T. Taner, *Extraction and Interpretation of the Complex Seismic Tract Part II, Geologic Interpretation*, abstract, abstract of papers Zagreb meeting, Geophysics Prospect, vol. 25, No. 3, p. 585 (1977).

R. E. Sheriff, M. T. Taner, D. Frye and F. Koehler, "Geologic Interpretation of Color Displays of Complex Seismic Trace", Conference Abstract, Am. Assoc. Pet. Geol., Bull., vol. 61, No. 5, pp. 829-830 (1977).

F. Koehler, M. T. Taner, R. E. Sheriff and D. Frye, *Extraction and Interpretation of the Complex Seismic Trace: Part I, Computational Procedures*, Conference abstract, Geophysics, vol. 42, No. 1, p. 162 (1977).

R. E. Sheriff, D. Frye, F. Koehler, and M. T. Taner, *Extraction and Interpretation of the Complex Seismic Trace: Part II, Geologic Interpretation*, Conference abstract, Geophysics, vol. 42, No. 1, p. 181 (1977).

F. Koehler, M. T. Taner, R. E. Sheriff and D. Frye, *Extraction and Interpretation of the Complex Seismic Trace: Part I, Computational Procedures*, Soc. Explor. Gophys., Annu. Int. Meet., p. 60 (1976).

R. E. Sheriff, D. Frye, F. Koehler, and M. T. Taner, *Extraction and Interpretation of the Complex Seismic Trace: Part II, Geologic Interpretation*, Soc. Explor. Geophys., Annu. Int. Meet., p. 60 (1976).

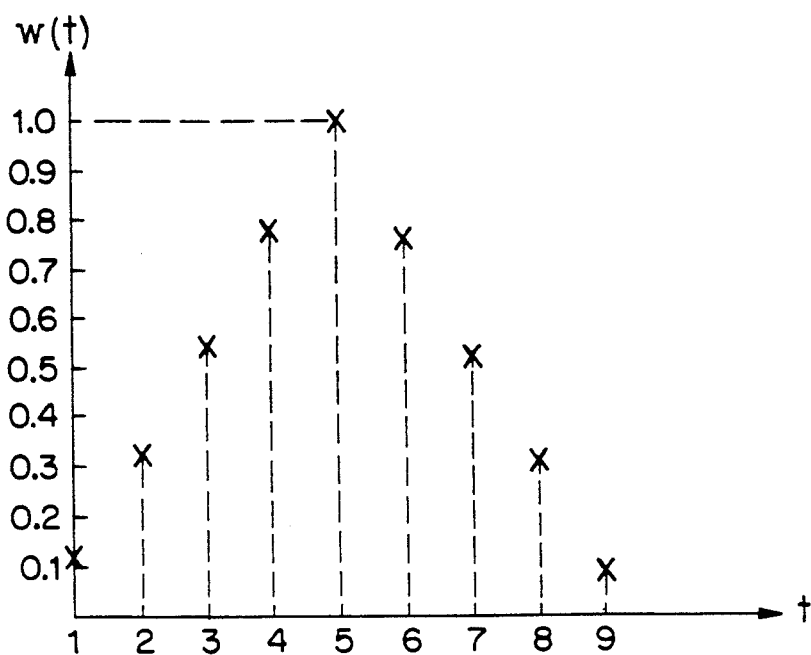
FIG. 8
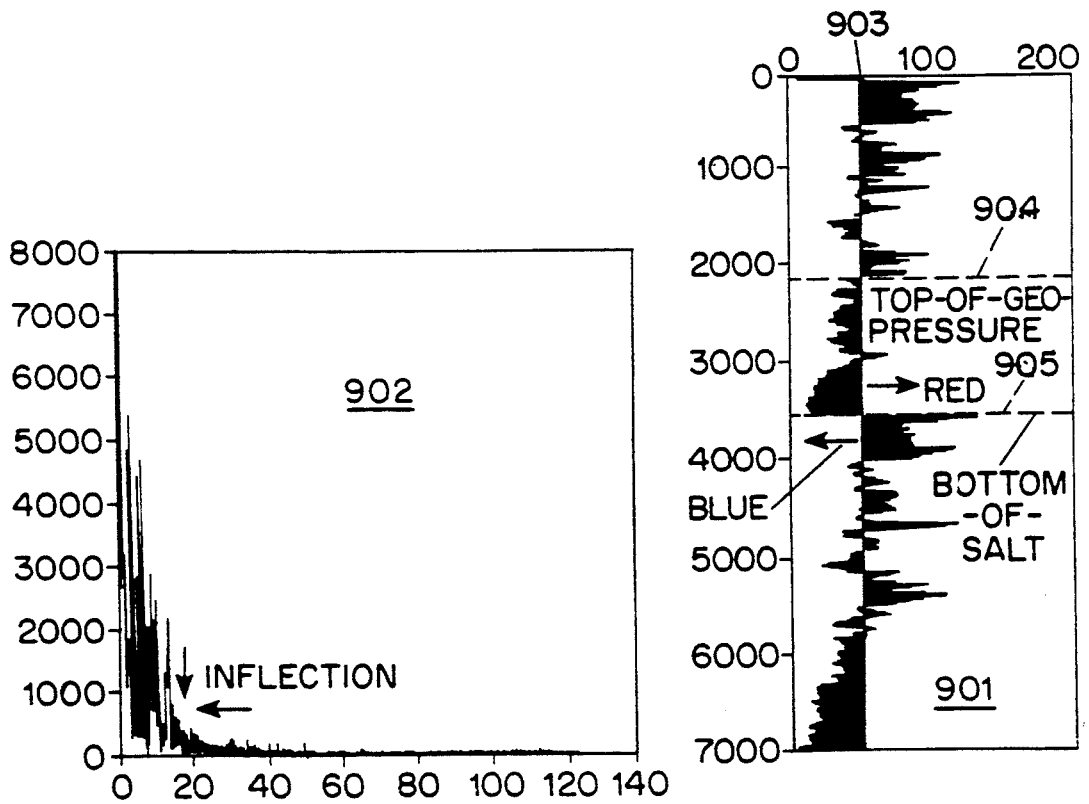
FIG. 9B
FIG. 9A

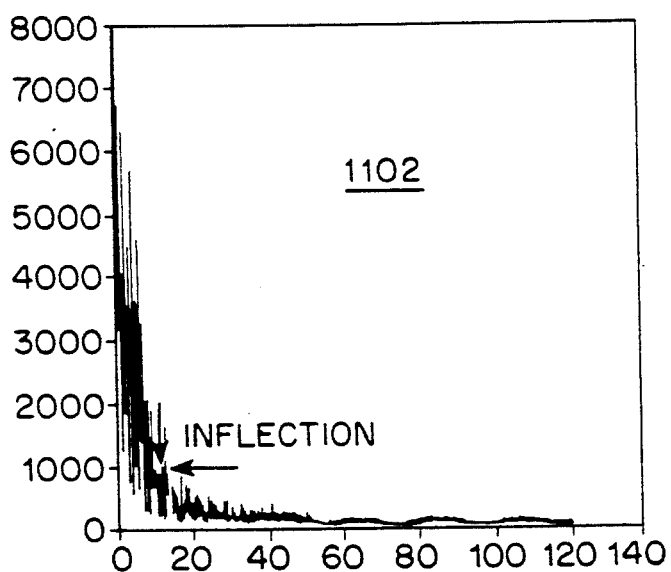
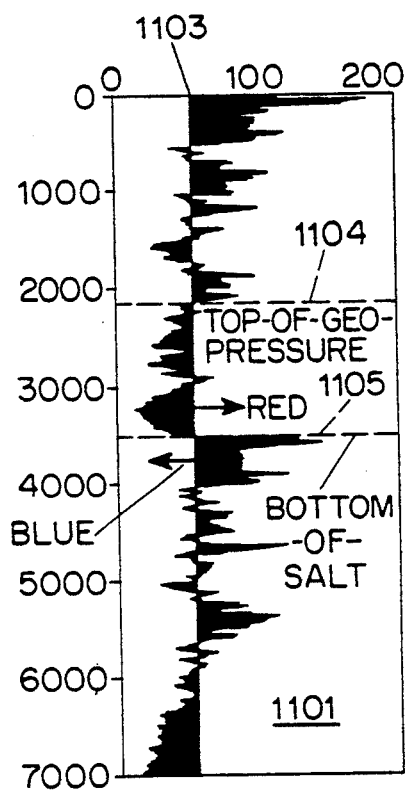
FIG. 11B
FIG. 11A

METHOD AND APPARATUS FOR PETROLEUM AND GAS EXPLORATION

A Microfiche Appendix containing 38 frames on one card is included as part of the Specification and is hereinafter referred to as Appendix I.

BACKGROUND OF THE INVENTION

The present invention relates to sensing of top-of-geopressure surfaces in exploration for petroleum or natural gas, and more particularly, to locating such top-of-geopressure surfaces using reflection seismic data gathered from a region of exploration and to predicting locations of oil and natural gas fields based on the topography of such top-of-geopressure surfaces.

Most major hydrocarbon producing basins of the world have deep stratigraphic structures that are overpressured. That is, the pore pressures within deeply buried rocks are greater than the hydrostatic pressure at comparable depths, the hydrostatic pressure at a given depth being equal to the density of the water times the depth times the gravitational constant. In order for such over-pressured formations to exist, the pore spaces within the formations must be hydraulically isolated from the interconnected network of pore spaces that extend from the surface to moderate depths in all basins. These formations are called "geopressured" because the excess pore pressures often approach the rock overburden pressure itself (i.e., the density of the rock times its depth times the gravitational constant).

It is often thought that seals of either chemical precipitates or very low permeability rock form at the top of such geopressured chambers, since any interconnectedness (i.e., permeability) would allow the excess pressures to equilibrate to hydrostatic pressures.

Processes which may cause geopressuring are: 1) excessive sedimentation burying rocks at such great depths and at such a fast rate that the pore pressures are not capable of equilibrating with the hydrostatic pressure gradient; 2) generation of excess pore pressures from chemical reactions that produce large positive volume changes, such as the maturation of hydrocarbons, and particularly, the production of natural gas from kerogens causing very large positive volume changes deep within a basin; and 3) thermal expansion of pore fluids caused by proximity to a strong heat source, such as salt structures. All three of the foregoing processes may contribute in varying degrees to the generation and maintenance of geopressured formations in basin interiors.

It has been recognized for some time that major hydrocarbon concentrations in geopressured basins are found in the high permeability traps above the top-of-geopressure surface in such basins. See, for example, J. M. Hunt, Am. Assoc. Petr. Geol. Bull., Vol. 74, pp. 1-12, 1990. Furthermore, the top-of-geopressure surfaces of such basins have considerable topography. For example, in the southern gulf coast of offshore Louisiana, relief of from 4,000 to greater than 10,000 feet has been found from well logs that penetrate this geopressured surface.

A known technique for locating the top-of-geopressure surface in a region of geological survey is to drill a well into the over-pressured sediment to detect excess pressures. The weight of drilling mud required to prevent blowouts is often used to determine the top-of-geopressure surface.

A more accurate known technique for determining the top-of-geopressure surface is to observe the decrease in porosity of sediments from velocity, density or resistivity well logs. See, for example, T. K. Kan et al., Am. Assoc. Petr. Geol. Abstr., Annual Meeting, 1990. The normal loading from sediments in a basin produces an exponential decrease in porosity with depth, and no geopressures. In a geopressured chamber, the porosity is anomalously high since more fluid is present in such a chamber than would be present in the absence of geopressure. Such anomalous porosities can be detected by well logs.

There have been several attempts to predict the top-of-geopressured surface from seismic reflection profiles. Velocity or density anomalies associated with the transition from normal pressures to over-pressures sometimes produces a sharp impedance boundary, which in turn causes a strong reflection event. See, for example, the aforementioned Kan et al. reference. A synthetic seismogram is generated from well logs in the vicinity of the seismic reflection profile to predict the amplitude and phase of the reflector corresponding to the top-of-geopressure surface. Furthermore, compressional to shear velocity ratios (i.e., Poisson's ratio) can be produced from the use of both traditional shear seismic sources on land, or from the prediction of pseudo-shear velocity logs based on logs of other physical properties gathered in the offshore. Since Poisson's ratio is known to change across the top-of-geopressure surface, such surface may be located by analyzing seismic reflection profiles to determine the ratio of compressional velocity to shear velocity.

It is known that complex trace analysis may be performed on reflection seismic traces to derive "attributes" of the normal seismic trace, such as reflection strength, instantaneous phase, instantaneous frequency, etc. See, for example, M. T. Taner et al., "Complex Seismic Trace Analysis," Geophysics, Vol. 44, No. 6, pp. 1041-1063 (June, 1979). A change in the reflection strength or instantaneous phase attribute is sometimes observed across the top-of-geopressured surface. Complex trace analysis is carried out by first performing a Hilbert transformation on the seismic time series from each received waveform train, in either relative amplitude profile (RAP) or true amplitude profile (TAP) format. The Hilbert transformation of the seismic time series is the spectral analysis over a moving time window of both the real and imaginary components of a complex time series, which produces the instantaneous amplitude and phase of the complex time series as a function of frequency within each window. As the time window is stepped along the seismic time series, the variation in instantaneous amplitude or phase may each be represented by respective time series. Typically, the window is 0.25 seconds long and is stepped a ong a seismogram at 0.1 second increments so that nine-tenth of the new window overlap with the signal from the previous window. The magnitude of the complex seismic time series obtained through complex trace analysis is referred to as the reflection strength attribute. The reflection strength time series has heretofore been analyzed to detect the instantaneous changes in amplitude which would be expected across major impedance boundaries produce by natural gas buildup zones in the subsurface and which would show up in sectional profile displays of the reflection strength as "bright spots."

The above-described techniques of locating top-of-geopressure surfaces by well logging have the drawback in that wells are expensive to drill, particularly in offshore regions. Consequently, in a given region of geological survey relatively few wells are drilled, and the top-of-geopressure surface for the region must be obtained by interpolating geopressure values between wells which are in general widely spaced. Moreover, wells are usually drilled at significant distances away from faults. Drilling of wells close to faults is generally avoided, and therefore well logging data in fault zones or close to fault zones are not usually available.

Known techniques for using complex trace analysis on reflection seismic traces and examining the attributes of such traces to extract geopressure information have the shortcomings of not providing reliable mapping of the top-of-geopressure surface. Although the change in impedance across the top-of-geopressured surface sometimes produces reflection strength or phase anomalies that can be recognized, the wavelength of seismic energy, which is typically approximately 25 meters, is too short to produce coherent reflection events in either real or attribute space in regions where the transition to over-pressured sediments occur over a depth interval which is much longer. For example, the transition zone in the United States gulf coast is between 100 and 1,000 feet thick.

Accordingly, a need clearly exists for a reliable technique of sensing the location of the top-of-geopressure from the surface, both on land and offshore. Furthermore, a need also exists for a more reliable technique for locating deposits of natural gas and petroleum based on the top-of-geopressure surface.

SUMMARY OF THE INVENTION

The foregoing drawbacks and shortcomings of the prior art are improved, and the aforementioned needs are substantially fulfilled by the present invention which in one aspect is a method for determining the top-of-geopressure surface for a region of geological survey by obtaining reflection seismic traces for the region and performing complex trace analysis on the seismic traces to derived reflection strength traces corresponding to the seismic traces. The reflection strength traces are then smoothed, preferable by window smoothing, and complex trace analysis is performed on the smooth reflection strength traces to derive second reflection strength traces corresponding to the seismic traces. The second reflection strength traces are then analyzed to locate an uppermost distinct subsurface boundary between high and low amplitude components, such distinct boundary being identified as being the top-of-geopressure surface for the region of geological survey.

According to an exemplary embodiment of the invention, the reflection seismic traces for the region are in the form of stacked and migrated relative amplitude profiles, and the second reflection strength traces are analyzed in record sections to locate an uppermost distinct subsurface boundary between high and low amplitude components across each record section. The distinct boundary across each record section is then identified as the top-of-geopressure profile for the record section. The top-of-geopressure profile identified for the various record sections are then combined to derive the top-of-geopressure surface for the region of geological survey.

In the exemplary embodiment the location of the distinct uppermost subsurface boundary between high and low amplitude components of the second reflection strength traces across each record section is carried out by displaying the second reflection strength traces in record section format with the amplitudes thereof coded in two states of contrast according to a preselected amplitude threshold. In the case of a color display, the two states of contrast consist of two different colors. The amplitude threshold is then adjusted to produce a most distinct visual boundary at the uppermost subsurface portion of the display between amplitude components represented by the two states of contrast for all of the record section displays of the second reflection strength traces.

Another aspect of the present invention is a method for petroleum or natural gas exploration in which the top-of-geopressure surface for a region of exploration is used to determine local maxima of horizontal gradient in the surface. Such locations, which frequently occur across fault zones, are then identified as having a high probability of containing deposits of natural gas or petroleum, particularly when correlated with a local maxima in subsurface heat flow.

Still another aspect of the present invention is an apparatus for determining the top-of-geopressure surface in accordance with the foregoing method for determining such surface.

BRIEF DESCRIPTION OF THE DRAWINGS

Exemplary embodiments in accordance with the present invention will now be described with reference to the accompanying drawings, in which:

FIG. 8 shows a nine-point discrete window used for waveform smoothing of the reflection strength traces to obtain smoothed reflection strength traces;

FIG. 9A shows a representative smoothed reflection strength trace corresponding to the seismic trace shown in FIG. 5A, and FIG. 9B shows power spectrum of the smoothed reflection strength trace, the plot of the smoothed reflection strength trace indicating an amplitude threshold used for coding the amplitude of the smoothed reflection strength trace in two colors and showing amplitude transitions attributed to the top-of-geopressure surface and the bottom-of-salt interface;

FIG. 11A shows a representative second reflection strength trace corresponding to the seismic trace shown in FIG. 5A, and FIG. 11B shows and the power spectrum of the representative second reflection strength trace, the plot of the second reflection strength trace indicating an amplitude threshold for coding the amplitude of the second reflection strength in two colors and showing amplitude component transitions corresponding to the top-of-geopressure surface and the bottom-of-salt interface;

Throughout the figures of the drawings the same reference numerals are used to denote like features in the depicted graphs and plots.

DETAILED DESCRIPTION

Figure 1:
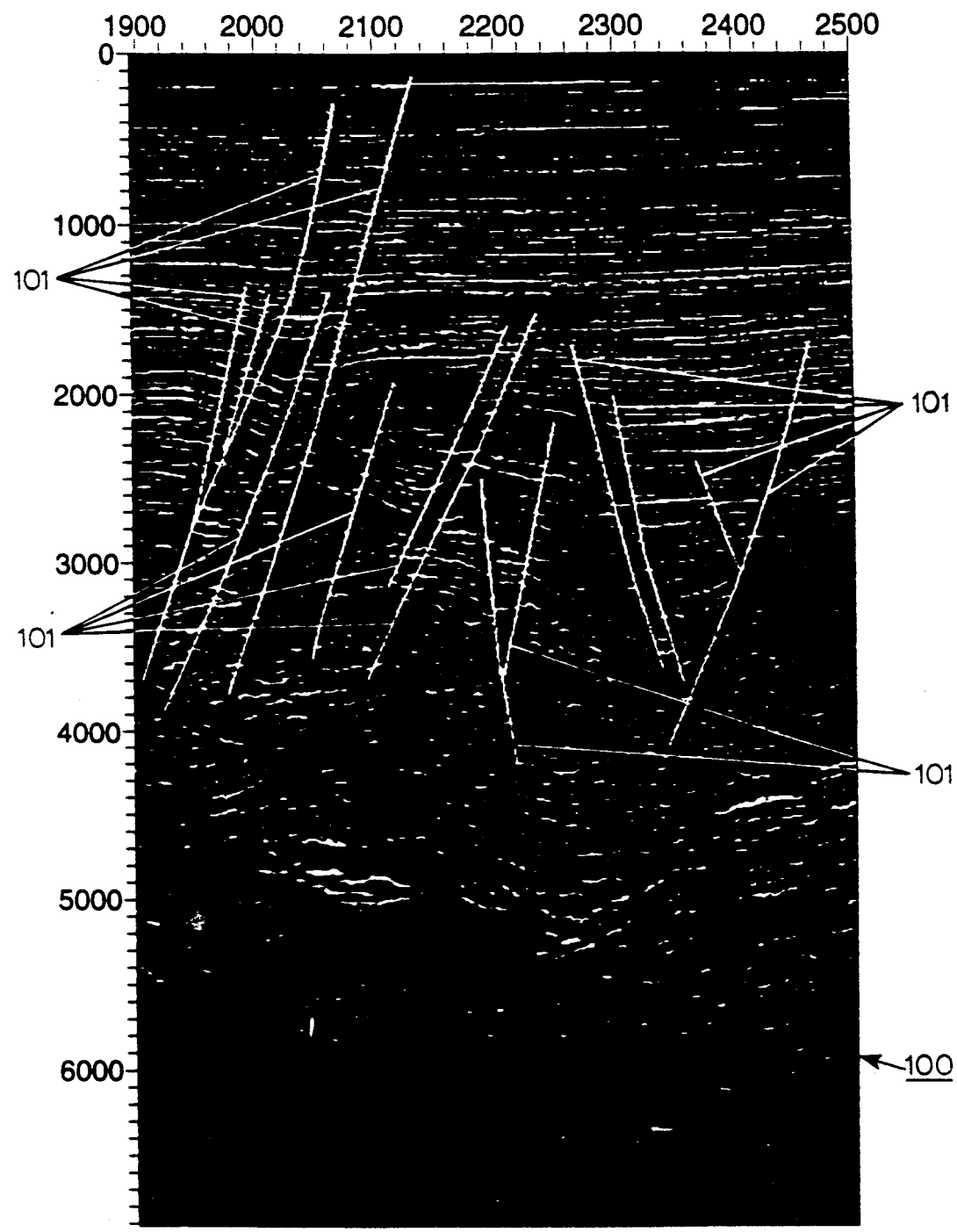
FIG. 1 is a record section format plot of relative amplitude seismic traces and fault lines, the amplitudes of the seismic traces being coded in white or black according to a preselected amplitude threshold, such that amplitude components above the threshold are represented by white and amplitude thresholds below the thresholds are represented by black.
Figure 2:
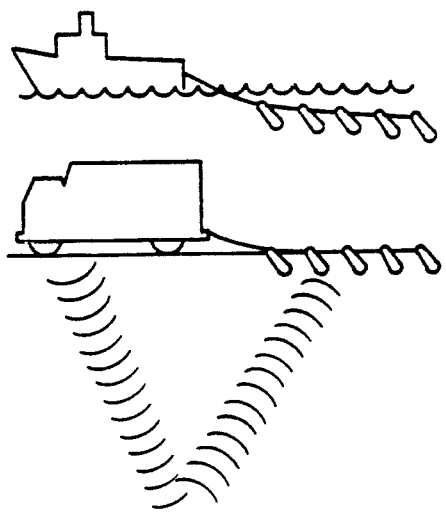
FIG. 2 is a schematic representation of the gathering of raw reflection seismic data on land and in the offshore.
Figure 3:
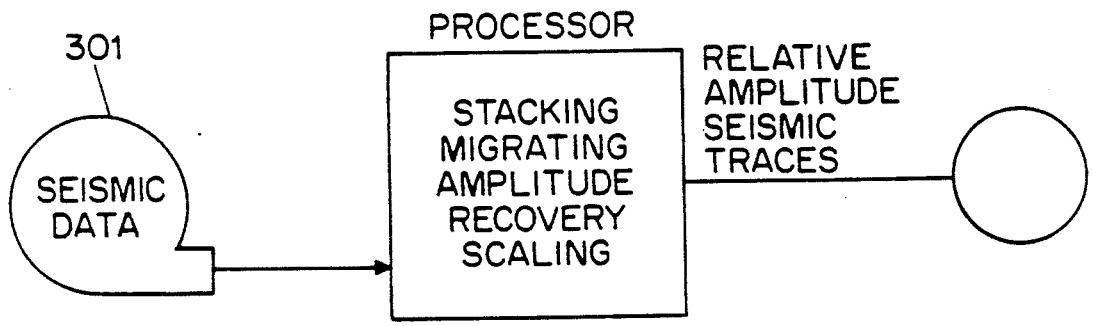
FIG. 3 is a schematic block diagram of the apparatus for preprocessing the raw seismic data to provide stacked and migrated relative amplitude seismic traces.

Referring now to FIG. 1 there is shown a plot of the reflection seismic traces of a record section of a region of geological survey, which in the present example is a 62 block area of the South Marsh Island/South Eugene Island Continental Margin of the Gulf of Mexico. The vertical scale in the figure is the two-way travel time in milliseconds, and the horizontal scale is in relative units, which may be converted to distance using appropriate navigational data. The seismic traces of FIG. 1 are derived from raw reflection seismic data obtained by conventional means over land or in the offshore, as illustrated schematically in FIG. 2. The raw seismic data, which is typically recorded on magnetic tape 301 in digital or analog format, is then preprocessed using the well known techniques of stacking, migrating, amplitude recovery and rescaling to generate the relative amplitude profiles used for the display shown in the FIG. 1. Such preprocessing of raw seismic data is depicted schematically in FIG. 3. The techniques for acquiring reflection seismic data on land and in the offshore, and for deriving stacked and migrated relative amplitude traces from the raw seismic data are described, for example, in a book entitled "Introduction to Geophysical Prospecting", Fourth Edition, by Milton B. Dobrin and Karl H. Savit, published by the McGraw-Hill Book Company (1988).

Figure 4:
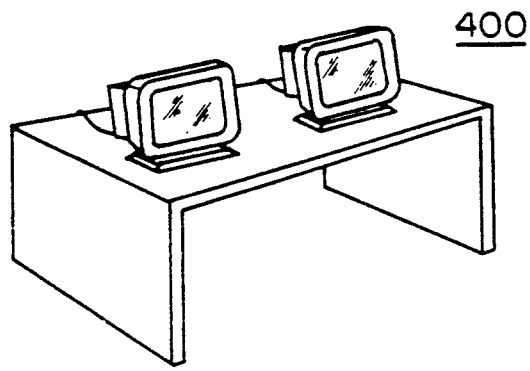
FIG. 4 is a schematic illustration of the workstation used for analyzing the relative amplitude seismic traces to derive the top-of-geopressure surface in accordance with the invention.

The stacked and migrated relative amplitude seismic traces for the region of geological survey are loaded via an optical disk (not shown) into an IBM RT PC workstation 400, and are processed and displayed as record section plots using the 2D-plus software package available from the Landmark Graphics Corporation. The workstation 400 is illustrated schematically in FIG. 4.

For the display shown in FIG. 1 the amplitudes of the seismic traces are coded in two colors (i.e., two states of contrast), chosen as red and blue, to emphasize the reflectors which are represented by the red regions (white regions in the figures). Coding of the amplitudes of the seismic traces is in accordance with a preselected amplitude threshold, such that amplitude components greater than the threshold are coded in red and amplitude components less than the threshold are coded in blue. In the depiction of FIG. 1, the red and blue colors in which the amplitudes of the seismic traces are coded are shown as white and black, respectively.

In addition to the seismic traces, FIG. 1 also shows geological fault lines 101, which are empirically determined from the display by tracing discontinuities in the reflectors.

Figure 5A:
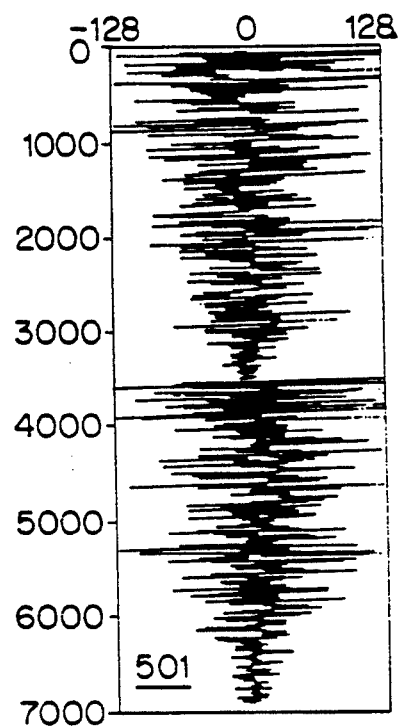
FIG. 5A shows a representative relative amplitude seismic trace.

It will be known to those skilled in the art of seismology that a given region of geological survey will be represented by a multiplicity of record section profiles, such as the one shown in FIG. 1. Each one of the record section profiles represents hundreds of relative amplitude seismic traces. In FIG. 5A there is shown a representative relative amplitude seismic trace 501 (trace 390 on line 84-6234E of a Gulf of Mexico seismic survey), and the in FIG. 5B there is shown power spectrum 502 of the seismic trace 501.

As mentioned above, complex trace analysis may be performed on a reflection seismic traces to derive "attributes" of the seismic trace. Such attributes are useful in separating the amplitude and phase information of the seismic data while retaining its local significance. As used in the present specification and claims, the term "complex trace analysis" shall mean the derivation of a complex seismic trace from a normal seismic trace, and the extraction of the attributes of the complex seismic trace in the manner described below.

Complex trace analysis treats a normal seismic trace $f(t)$ as the real component of a complex trace, $F(t) = f(t) + if^*(t)$. The imaginary component $f^*(t)$ is derived by taking the Hilbert transform of the real component $f(t)$, which in its discrete form may be expressed as $$\left. \begin{array}{l} f^*(t) = \frac{1}{\pi} \sum_{n=-\infty}^{\infty} f(t - n\Delta t) \frac{1 - e^{i\pi n}}{n} \\ \text{and} \\ f^*(t) = \frac{2}{\pi} \sum_{n=-\infty}^{\infty} f(t - n\Delta t) \frac{\sin^2(\pi n/2)}{n} \end{array} \right\} n \neq 0, \quad (1)$$

where $\Delta t$ is the sample interval. Equivalent relations for deriving the imaginary component $f^*(t)$ of the complex trace $F(t)$ known to those skilled in the art and are described, for example, in the above-cited M. T. Taner et al. reference.

The complex trace $F(t)$ may be written as a phasor $$F(t) = f(t) + if^*(t) = A(t)e^{i\theta(t)}, \quad (2)$$

where $A(t)$ is called the "reflection strength" attribute which may be expressed as $$A(t) = |F(t)| = [f^2(t) + f^{*2}(t)]^{\frac{1}{2}}, \quad (3)$$

and $\theta(t)$ is called the "instantaneous phase" attribute which may be expressed as $$\theta(t) = \tan^{-1}[f^*(t)/f(t)]. \quad (4)$$

The time derivative of the instantaneous phase is called the "instantaneous frequency" attribute, which may be expressed as $$\frac{d\theta(t)}{dt} = \omega(t) = \frac{d}{dt}\{\tan^{-1}[F^*(t)/f(t)]\}. \quad (5)$$

In addition to the above, other attributes which are commonly derived from complex trace analysis are: (1) "average weighted frequency", which is the instantaneous frequency weighted by the reflection strength and smoothed; and (2) "apparent polarity", which is the sign of the instantaneous phase at reflection strength maxima.

Reflection strength is a measure of the amplitude of the total seismic energy and is independent of phase. Therefore, the reflection strength may be maximum at phase points other than the peaks and troughs of the normal seismic trace. This attribute provides a measure of the reflectivity of interfaces in subsurface geological structure, provided that appropriate corrections have been made for other causes of amplitude change. It is known that major lithologic changes, nonuniformities, seismic sequence boundaries and natural gas accumulations often result in strong reflection strengths. Sharp local changes may indicate faulting or hydrocarbon accumulations where trapping conditions are favorable. As mentioned above, hydrocarbon accumulations, especially natural gas, often appear as high amplitude "bright spots" in a reflection strength profile, although not all bright spots are correlated with hydrocarbon accumulations and some accumulations may not have associated amplitude anomalies.

Instantaneous phase emphasizes a continuity of events and is a value associated with a point in time. Because instantaneous phase is independent of reflection strength, it often makes weak coherent events clearer. Displays of the instantaneous phase are effective in showing discontinuities, faults, pinch-outs, angularities, and events with different dip attitudes which interfere with each other. Prograding sedimentary layer patterns and regions of on-lap layering and off-lap often show with special clarity, and phase displays are helpful in picking seismic sequence boundaries.

Instantaneous frequency is also a value associated with a point in time. Most reflection events are the composite of individual reflections from a number of closely spaced reflectors which remain nearly constant in acoustic impedance contrast and separation. The superposition of individual reflections may produce a frequency pattern which characterizes the composite reflection. Instantaneous frequency often provides a useful correlation tool. The character of a composite reflection will change gradually as the sequence of layers gradually changes in thickness and lithology. More rapid changes occur at pinchouts and at the edges of hydrocarbon-water interfaces. A shift towards lower instantaneous frequencies is often seen underneath natural gas sands, and also underneath condensate and oil reservoirs.

Weighted average frequency emphasizes the frequency of the stronger reflection events and smooths irregularities caused by noise. Displays of weighted average frequency are sometimes excellent for enhancing reflection continuity. Hydrocarbon accumulations are often evidenced by low frequencies.

Apparent polarity indicates both the sign and magnitude of the reflectivity under the following idealized circumstances of: a single interface, a zero-phase wavelet, no ambiguity caused by possible phase inversion, and proper amplitude correction. However, because most reflection events are interference composites of several reflections, polarity often lacks a clear correlation with reflection coefficient, and therefore it is qualified as apparent polarity. Polarity sometimes distinguishes between different kinds of bright spots. For example, bright spots associated with natural gas accumulations in elastic sediments usually have lower acoustic impedance than surrounding beds, and therefore show negative polarity for reservoir top reflections and positive polarity for reflections from gas-oil or gas-water interfaces.

Figure 5B:
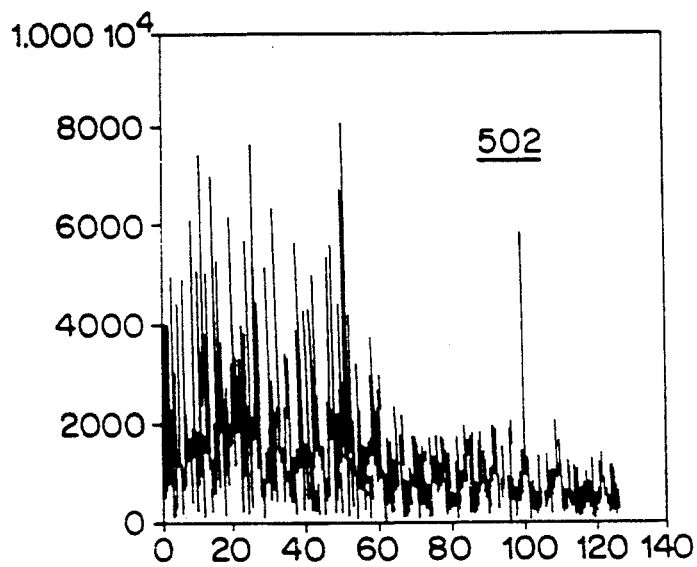
FIG. 5B shows the power spectrum for the seismic trace.
Figure 6A:
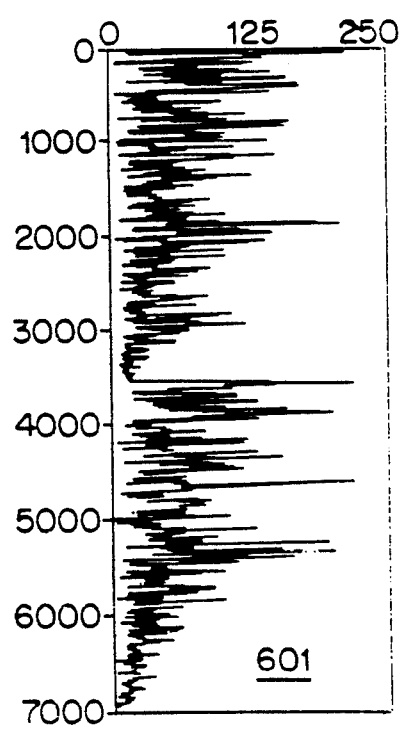
FIG. 6A shows a representative reflection strength trace corresponding to the seismic trace shown in FIG. 5A.
Figure 6B:
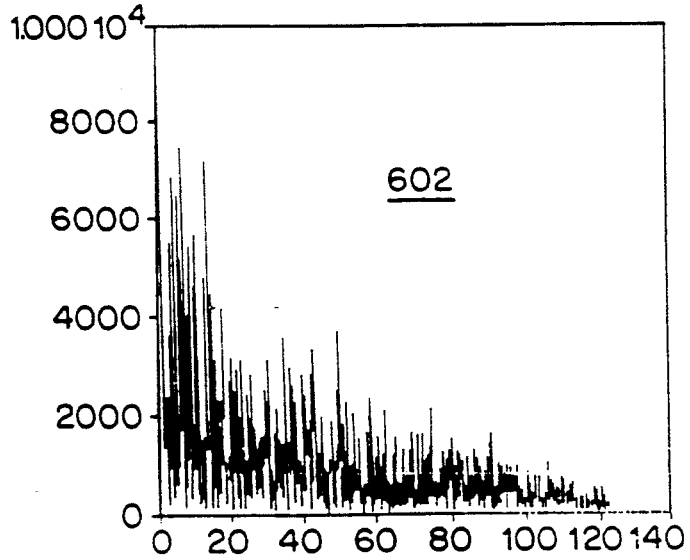
FIG. 6B shows the power spectrum of the representative reflection strength trace.

Turning now to FIGS. 6A and 6B there are shown a representative reflection strength trace 601 and its power spectrum 602. The reflection strength trace 601 is computed using equation (3), with the normal seismic trace 501 of FIG. 5 as the real component $f(t)$. The imaginary component $f^*(t)$ is computed using the discrete Hilbert transform of equation (1) with $n = 63$ and $\Delta t = 4$ ms. The foregoing computations were carried out using a computer program called ahhilbert.c. A source code listing of the ahhilbert.c program is included in Appendix I.

By comparing the power spectrum 502 shown in FIG. 5B of the normal seismic trace 501 in FIG. 5A with the power spectrum shown in FIG. 6B 602 of the corresponding reflection strength 601 in FIG. 6A, it may be seen that the bandwidth of the normal seismic trace 501 is approximately the same as that of the corresponding reflection strength 601.

Figure 7:
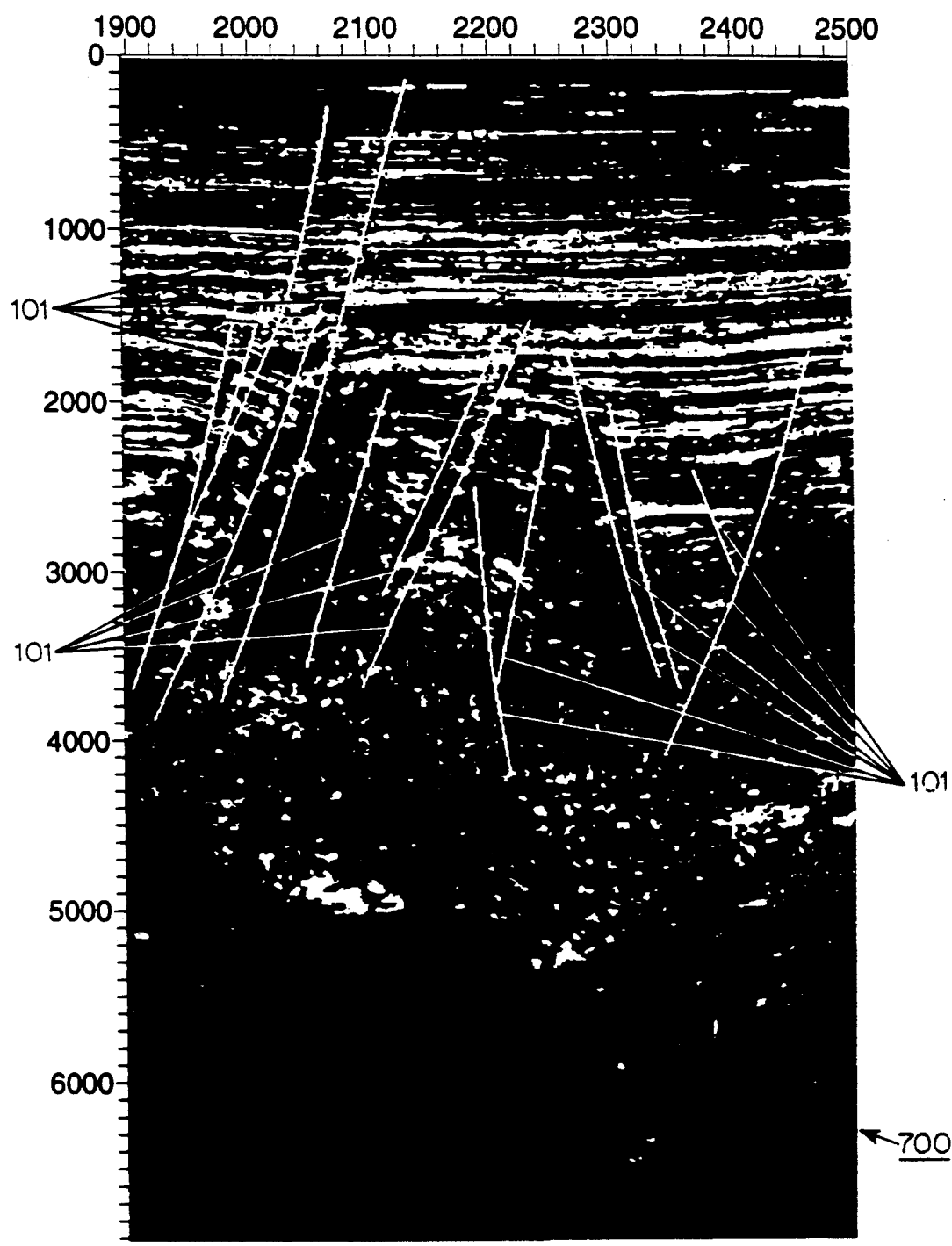
FIG. 7 is a section format plot of the reflection strength traces corresponding to the seismic traces shown in FIG. 1, and the fault lines, the amplitudes of the reflection strength traces are coded in white or black according to a preselected amplitude threshold, such that amplitude components greater than the threshold are represented by white and amplitude components smaller than the threshold are represented by black.

Referring now to FIG. 7, there is shown a record section format plot 700 of the reflection strength traces derived from complex trace analysis of the relative amplitude seismic traces represented by the record section display 100 of FIG. 1. The fault lines 101 empirically determined from the plot 100 of FIG. 1 are included in the reflection strength plot 700. The plot 700 of FIG. 7 was generated on the IBM RT PC workstation using the Landmark Graphics Corporation 2D-plus software package. In the display 700 the amplitudes of the reflection strength traces were coded in two different colors (i.e., two states of contrast), chosen as red and blue, with red representing the higher amplitude. For simplicity of the depiction, the two states of contrast in FIG. 7 are shown as white and black corresponding respectively to red and blue in the actual display.

It may be seen from the plot 700 of reflection strength in FIG. 7 that no distinct boundary is readily discernible between amplitude components of the reflection strength traces represented by the two states of contrast across the record section. As mentioned above, specific seismic reflection events corresponding to the onset of geopressure are not always manifested in distinct amplitude changes because the thickness of the transition from normally pressured to overpressured formations can vary widely over very short lateral distances.

Changes in the amplitudes of the reflection strength trace caused by seismic reflection events attributable to the onset of geopressure is enhanced by performing waveform smoothing on the reflection strength traces. Such waveform smoothing is preferably carried out by the known technique of window smoothing in which a discrete convolution of a window function w(t) and the reflection strength time series is computed to derive a smoothed reflection strength time series. In the present example, smoothing of the reflection strength time series 601, r(t), shown in FIG. 6 using a nine-point discrete window function w(t) shown in FIG. 8 to obtain the smoothed reflection strength time series sr(nΔt) may be expressed as $$sr(n\Delta t) = \frac{\sum_{m=1}^{9} w(m\Delta t)r[(n-m)\Delta t]}{\sum_{m=1}^{9} w(m\Delta t)}, \qquad (6)$$

where Δt is the sampling interval equal to 4 milliseconds in the present example. The result of the above-identified window smoothing, which is carried out using a program called the ftn_ah_smth.f, is shown as smoothed reflection strength trace 901 in FIG. 9A. The source code listing of the ftn_ah_smth.f program is included in Appendix I.

The power spectrum 902 of the smoothed reflection strength trace 901 is shown in FIGS. 9B and 9A, respectively. A comparison of this power spectrum with the power spectrum 602 shown in FIG. 6B of the "unsmoothed" reflection strength 601 shown in FIG. 6A reveals that the bandwidth of the smoothed reflection strength trace 901 is greatly reduced from that of the unsmoothed reflection strength trace 601.

It is noted that as an alternative to window smoothing, a low-pass filter having a cutoff frequency of between 10 and 20 Hz may be used for waveform smoothing of the reflection strength traces.

Referring again to FIG. 9A, the amplitude of the smoothed reflection strength trace 901 is coded in two different colors (i.e., two states of contrast), chosen as red and blue, for display purposes. An amplitude threshold 903 is selected such that amplitude components which are below the threshold are displayed in blue, while amplitude components which are greater than the threshold are displayed in red. When coded in this manner, two clear subsurface transitions 904 and 905 between high and low amplitude components are apparent. The uppermost transition 904 at shorter reflection times is attributed to the top-of-geopressure surface, while the transition 905 at longer reflection times 905 is attributed to the bottom-of-salt interface.

Figure 10:
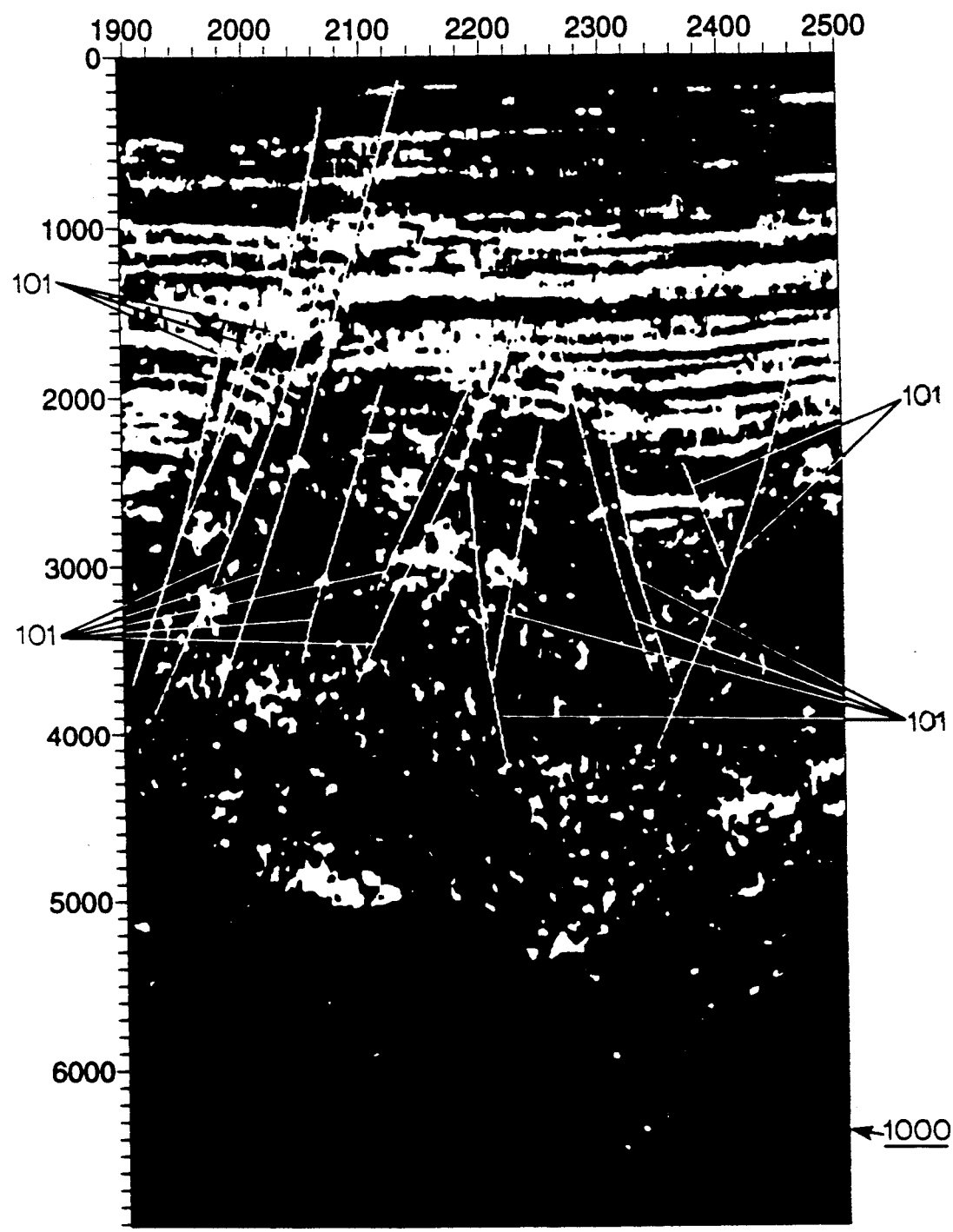
FIG. 10 is a section format plot of the smoothed reflection strength traces corresponding to the seismic traces shown in FIG. 1, and the fault lines, the amplitudes of the smoothed reflection strength traces are coded white in or black according to a preselected amplitude threshold such that amplitude components greater than the threshold are represented by white and amplitude components less than the threshold are represented by black.

Turning now to FIG. 10, there is shown a record section plot 1000 of the smoothed reflection strength traces with the amplitudes of such traces coded in two levels of contrast using the threshold for amplitude coding indicated in the representative smoothed reflection strength trace 901 of FIG. 9A. The fault lines 101 are again included in the plot. The colors red and blue of the actual display of the plot are shown as white and black, respectively, in FIG. 10.

It is noted that although clear transitions between amplitude components represented by the two states of contrast are apparent for the individual smoothed reflection strength trace 901 in FIG. 9A, it is difficult to determine a distinct boundary between amplitude components represented by the two states of contrast across the sectional profile display of the smoothed reflection strength traces in FIG. 10. However, it has been found that by appropriate adjustment of the degree of smoothing of the reflection strength traces, such as by adjusting the cutoff frequency of a low-pass filter used for the smoothing, and by appropriate adjustment of the amplitude threshold used for coding the smoothed reflection strength traces in the two states of contrast, a boundary attributable to the top-of-geopressure surface may be found between amplitude components represented by the two states of contrast across the sectional profile display of the smoothed reflection strength traces.

In accordance with the invention, complex trace analysis is performed on the smoothed reflection strength traces to derive the amplitude envelope of each such trace. The amplitude envelopes of the smoothed reflection strength trace are hereafter referred to as second reflection strength traces corresponding to the relative amplitude seismic traces. Complex trace analysis on the smoothed reflection strength traces is carried out in the same manner as for the relative amplitude seismic traces by using the Hilbert transform of equation (1) to derive the imaginary components of the smoothed reflection strength traces, and by using equation (3) to derive the second reflection strength traces.

Referring now to FIGS. 11A and 11B, there are shown a representative second reflection strength trace 1101 derived from the smoothed reflection strength trace 901 using the ahhilbert.c program, and the power spectrum 1102 of the representative second reflection strength trace. An amplitude threshold 1103 is selected for coding the amplitude of the second reflection strength trace 1101 in two different colors (i.e., two states of contrast), chosen as red and blue, for display purposes. Amplitude components which are above the threshold 1103 are displayed in red, while amplitude components which are below that threshold are displayed in blue. Coding of the amplitude of the second reflection strength trace 1101 in this manner provides clear subsurface transitions 1104 and 1105 between the amplitude components represented by the two states of contrast. The uppermost amplitude transitions 1104 is attributed to the top-of-geopressure surface, while the lower amplitude transition 1105 is attributed to the bottom-of-salt interface.

Figure 12:
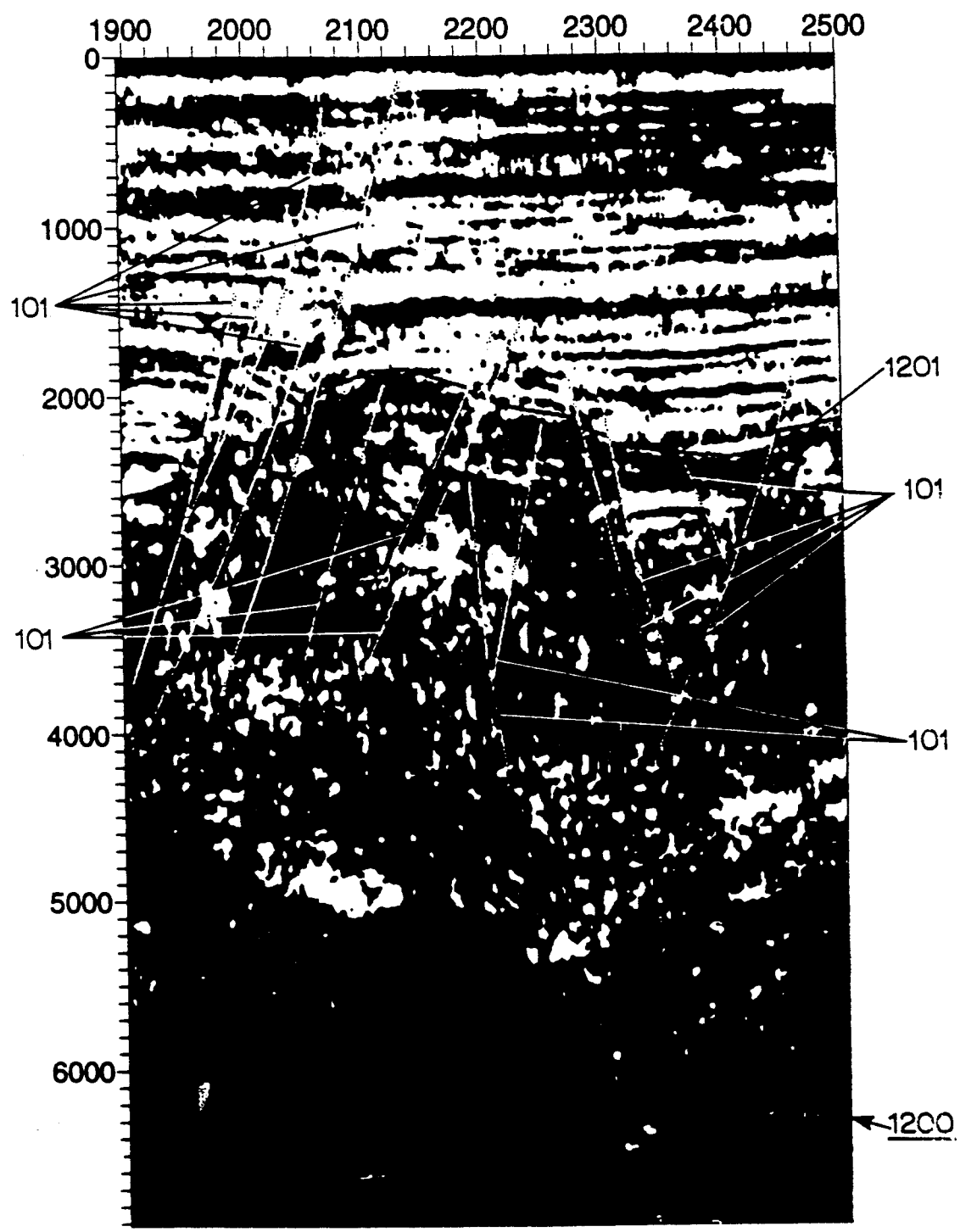
FIG. 12 is a plot of the second reflection strength traces corresponding to the seismic traces shown in FIG. 1, and the fault lines, the amplitudes of the second reflection strength traces are coded in white or black according to a preselected amplitude threshold, such that amplitude components greater than the threshold are represented by white and amplitude thresholds less than the threshold are represented by black, the plot showing the top-of-geopressure profile in the form of a distinct uppermost subsurface boundary between amplitude components represented by white and black.

Turning now to FIG. 12, there is shown a record section format display 1200 of second reflection strength traces, corresponding to the smoothed reflection strength traces of FIG. 10, with the amplitude components thereof coded in the two states of contrast described above in connection with FIG. 11. Again for simplicity of the depiction, the red and blue colors of the actual display are represented by the white and black states of contrast, respectively, in FIG. 12. The geological fault lines 101 are also included in the display.

It may be seen from the display of FIG. 12 that an uppermost distinct subsurface boundary 1201 extending across the record section between the amplitude components of the second reflection strength traces represented by the two states of contrast is readily discernible. This distinct boundary 1201 is attributed to the top-of-geopressure surface and represents a top-of-geopressure profile in the record section plot 1200. Similar distinct boundaries are present in the displays for the other record sections of the region of geological survey. The amplitude threshold used for coding the amplitude components of the second reflection strength traces in the two states of contrast is advantageously selected to provide the most distinct uppermost subsurface boundary between amplitude components of the two states of contrast in all of record sections for the region of geological survey.

After the top-of-geopressure profile is identified for each record section of the region of geological survey, a conventional velocity mapping technique, such as well logged sonic velocities, vertical seismic profiles, check shots in wells, or semblance analysis of seismic data is then used to convert the vertical time scales of the record section profiles to a depth scale. Known interpolation techniques are then used between the top-of-geopressure profiles of the various record sections to form a raster image of the subareal extent of top-of-geopressure surface. In the exemplary embodiment of the invention velocity mapping was performed using the 3D-plus program available from the Landmark Graphics Corporation, and the mapping of the top-of-geopressure surface from the top-of-geopressure profiles was carried out using the SURFAS program available from Geophysical Techniques Corporation.

The top-of-geopressure surface determined from reflection seismic traces in accordance with the present invention was calibrated to known observations of the top-of-geopressure data from wells drilled in the same region of geological survey. A well known linear correction for inaccuracies in velocity conversion (i.e., a slope correction) is then applied to the raster map of the top-of-geopressure surface.

Figure 13:
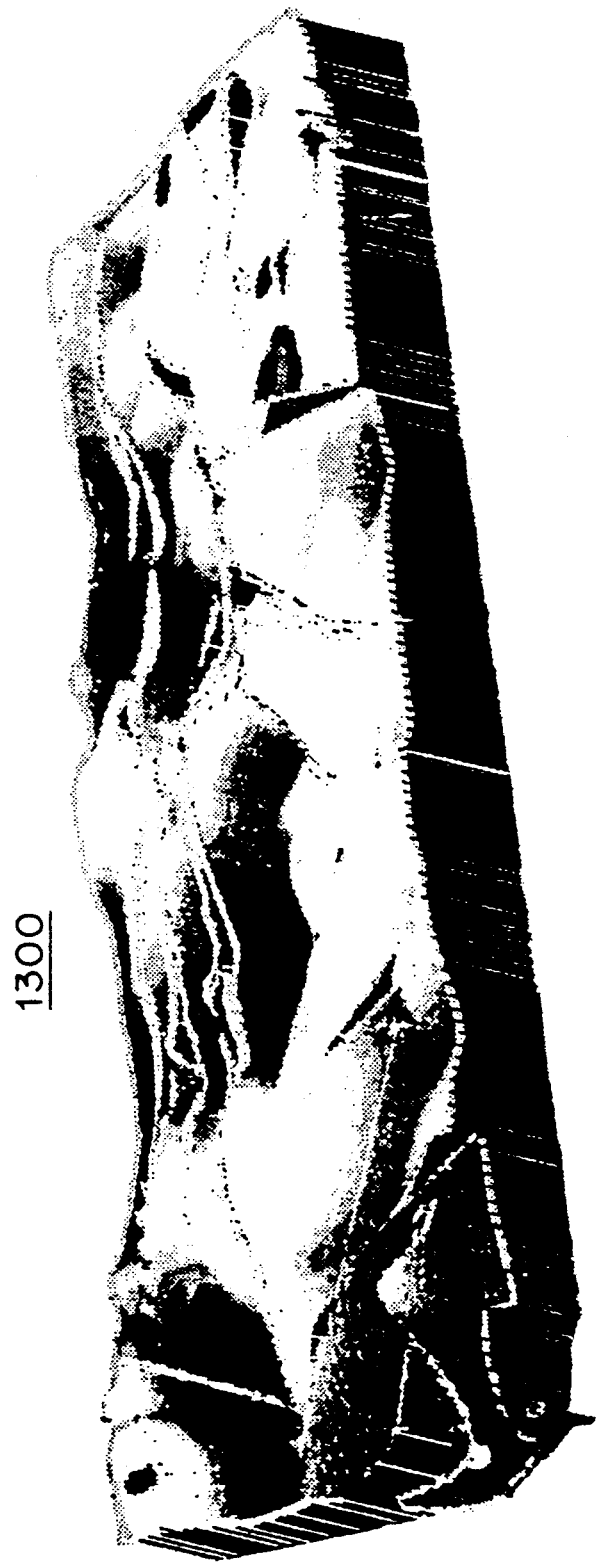
FIG. 13 is an isometric topographical map of the top-of-geopressure surface derived from analysis of reflection seismic traces in accordance with the invention.

Turning now to FIG. 13, there is shown an isometric view 1300 of the topography of the top-of-geopressure surface over a 62 block area (each block being 3 miles by 3 miles) of the South Marsh Island/South Eugene Island continental margin of the Gulf of Mexico (south of Louisiana) using the above-described analysis technique in accordance with the present invention on reflection seismic data gathered for the region. The top-of-geopressure surface of FIG. 13 was converted from a two-way travel time surface to a true depth surface using well known velocity transformation techniques and then compared to a top-of-geopressure surface generated from logs from 152 wells drilled throughout the same region of geological survey. Good correlation was found between the top-of-geopressure surfaces derived by the two techniques, except for major differences in the areas where major faults are known to exist. The differences between the top-of-geopressure surface derived from reflection seismic data in accordance with the present invention and that derived from well logging data can be explained by the extensive interpolation required to derive a top-of-geopressure surface from data obtained from relatively few, widely-spaced wells drilled in the region of survey, and the total absence of well logging data across major faults in the region, since wells are hardly ever drilled in fault zones. However, large offsets in geopressure are known to almost always occur across such faults.

As mentioned above, it is known that the occurrence of hydrocarbon accumulations correlates with top-of-geopressure. See for example the above-cited J. M. Hunt reference. However, it has not been previously understood how the topography of the top-of-geopressure surface determines the locations of hydrocarbon traps. Owing to insufficient detail and accuracy in the top-of-geopressure surface maps derived from conventional well logging, clear correlations between the locations of known oil and natural gas fields, and the topographical features of the top-of-geopressure surface could not be established. Using the top-of-geopressure surface maps derived from the analysis of reflection seismic traces in accordance with the present invention which provide far greater topographical detail of the surface, including across faults, a correlation has been found between known oil and natural gas fields and local maxima in the horizontal gradient in the top-of-geopressure surface. The term "horizontal gradient" as used herein shall mean a gradient in a direction parallel to the surface of the earth. This correlation has been found to be particularly strong for local maxima in the horizontal gradient concentrated across major fault offsets in the top-of-geopressure surface which are parallel to the predominant strike directions of the faults.

Since the top-of-geopressure surface is isobaric, local maxima of horizontal gradient in the surface is readily determined using known techniques, and a horizontal gradient map for the top-of-geopressure surface may be generated to facilitate locating local maxima thereof. Because a strong correlation has been found between the occurrences of hydrocarbon deposits and local maxima of horizontal gradient in the top-of-geopressure surface in the predominant strike directions of major faults, such local maxima are good drilling targets in the exploration for petroleum or natural gas.

The characteristics of subsurface heat flow are known to be related to oil and natural gas horizons. A preferred technique for mapping subsurface heat flow is disclosed and claimed in commonly assigned U.S. Pat. No. 4,947,682 issued to Roger N. Anderson and Colin F. Williams on Aug. 4, 1990, which is incorporated herein by reference. A comparison of a map of subsurface heat flow measured by the technique of the aforementioned patent for the same offshore Louisiana region for which the top-of-geopressure surface of FIG. 13 was derived indicates that local maxima of subsurface heat flow, or hot spots, are found to coincide with major local maxima of horizontal gradients in the top-of-geopressure surface, particularly where the surface is offset by faults. Such coincidences are consistent with the model that hot oil or gas-saturated fluids have recently been expelled from geopressured chambers. Therefore, where subsurface heat flow has been measured for a region of exploration, drilling targets having a high probability of producing petroleum or gas are found in regions where a local maximum of subsurface heat flow coincides with a local maximum of horizontal gradient in the top-of-geopressure surface.

While determination of the top-of-geopressure surface by analysis of reflection seismic data in accordance with one aspect of the invention is preferred, the method for petroleum or gas exploration in accordance with another aspect of the invention may utilize a top-of-geopressure surface determined by any technique, so long as such surface has sufficient topographical details, especially across faults, to enable accurate determination of the local maxima of horizontal gradient in the surface.

While the invention has been described in terms of the foregoing specific embodiments thereof, it will be apparent to those skilled in the art that various alterations and modifications may be made to the described embodiments without departing from the scope of the invention, as defined by the appended claims. For example, the location of an uppermost distinct subsurface boundary between high and low amplitude components of the second reflection strength traces, or between high and low amplitude components of appropriately smoothed and amplitude-coded reflection strength traces, need not be carried out visually on the display of a workstation with manual adjustments of the amplitude coding threshold and/or the degree of waveform smoothing, but may be performed automatically as part of an integrated program for analyzing reflection seismic traces to derive the top-of-geopressure profile or surface.

We claim:

1. A method for determining the top-of-geopressure surface in a region of geological survey comprising the steps of:
   obtaining reflection seismic traces for the region of geological survey;
   performing complex trace analysis on the seismic traces to derive first reflection strength traces corresponding to the seismic traces;
   performing waveform smoothing on the first reflection strength traces to derive smoothed first reflection strength traces corresponding to the seismic traces;
   performing complex trace analysis on the smoothed first reflection strength traces to derive second reflection strength traces corresponding to the seismic traces;
   analyzing the second reflection strength traces, including locating an uppermost distinct subsurface boundary between high and low amplitude components of the second reflection strength traces; and
   identifying the uppermost distinct subsurface boundary between high and low amplitude components of the second reflection strength traces as being the top-of-geopressure surface for the region of geological survey.

2. The method of claim 1, wherein the step of obtaining reflection seismic traces includes:
   gathering raw reflection seismic data for the region of geological survey; and
   pre-processing the raw reflection seismic data to derive stacked and migrated relative amplitude profile seismic traces corresponding to the raw reflection seismic data.

3. The method according to claim 2, wherein the step of analyzing the second reflection strength traces includes:
   analyzing the second reflection strength traces in record sections, including locating an uppermost distinct subsurface boundary between high and low amplitude components of the second reflection strength traces across each record section;
   identifying the uppermost distinct subsurface boundary between high and low amplitude components of the second reflection strength traces across each record section as being the top-of-geopressure profile for the record section; and
   using the top-of-geopressure profile identified in each record section to derive the top-of-geopressure surface for the region of geological survey.

4. The method according to claim 1, wherein the smoothing of the first reflection strength traces comprises window smoothing.

5. The method according to claim 1, further comprising the step of using the identified top-of-geopressure surface to locate local maxima of horizontal gradient in the top-of-geopressure surface for the region of geological survey.

6. The method according to claim 3, wherein the step of analyzing the second reflection strength traces by record sections comprises:
   displaying the second reflection strength traces in record section format with the amplitudes thereof coded in two states of contrast;
   selecting an amplitude threshold for coding the second reflection strength traces in the two states of contrast to produce a distinct visual uppermost boundary between amplitude components of the second reflection strength traces represented by the two states contrast across each record section display of the second reflection strength traces for the region of geological survey; and
   identifying the distinct visual uppermost boundary between the amplitude components of the second reflection strength traces represented by the two states of contrast in each record section display of the second reflection strength traces as being the top-of-geopressure profile for the record section.

7. The method according to claim 6, wherein a single amplitude threshold for coding the amplitudes of the second reflection strength traces in the two states of contrast is selected to produce the most distinct visual uppermost boundary between the amplitude components of the second reflection strength traces represented by the two levels of contrast in each record section display of the second reflection strength traces for the region of geological survey.

8. The method according to claim 6, wherein the second reflection strength traces are displayed in color, and the two states of contrast in which the second reflection strength traces are coded consist of a first and a second color, respectively.

9. A method for determining the top-of-geopressure surface in a region of geological survey comprising the steps of:
   obtaining reflection seismic traces for the region of geological survey;
   performing complex trace analysis on the seismic traces to derive reflection strength traces corresponding to the seismic traces;
   performing waveform smoothing on the reflection strength traces to derive smoothed reflection strength traces corresponding to the seismic traces;
   displaying the smoothed reflection strength traces in record section format with the amplitudes thereof coded in two states of contrast based on an amplitude threshold, wherein the degree of waveform smoothing of the reflection strength traces and/or the amplitude threshold for coding the reflection strength traces in the two states of contrast are selected to permit visual location of an uppermost subsurface boundary between amplitude components represented by the two states of contrast across each record section display of the smoothed reflection strength traces for the region of geological survey;
   identifying the visually located uppermost boundary between the amplitude components of the smoothed reflection strength traces represented by the two states of contrast in each record section display of the smoothed reflection strength traces as being the top-of-geopressure profile for the record section; and using the top-of-geopressure profile identified in each record section to derive the top-of-geopressure surface for the region of geological survey.

10. A method for petroleum or natural gas exploration comprising the steps of:
   deriving a top-of-geopressure surface for a region of exploration;
   determining local maxima of horizontal gradient in the top-of-geopressure surface, including across any faults; and
   identifying as drilling targets the local maxima of horizontal gradient in the top-of-geopressure surface.

11. The method for petroleum or natural gas exploration according to claim 10 further comprising the steps of:
   mapping the subsurface heat flow in the region of exploration; and
   identifying as drilling targets coincidences of local maxima in the subsurface heat flow and the local maxima of horizontal gradient in the top-of-geopressure surface.

12. The method for petroleum or natural gas exploration according to claim 10, wherein the drilling targets are identified as the local maxima of horizontal gradient in the top-of-geopressure surface in the predominant strike direction of a major fault.

13. The method for petroleum or natural gas exploration according to claim 10, wherein the step of deriving the top-of-geopressure surface for the region of exploration comprises the steps of:
   performing complex trace analysis on reflection seismic traces for the region of exploration to derive first reflection strength traces corresponding to the seismic traces;
   performing waveforms smoothing of the first reflection strength traces to obtain smoothed first reflection strength traces corresponding to the seismic traces;
   performing complex trace analysis on the smoothed first reflection strength traces to obtain second reflection strength traces corresponding to the seismic traces;
   analyzing the second reflection strength traces, including locating an uppermost distinct subsurface boundary between high and low amplitude components of the second reflection strength traces; and
   identifying the uppermost distinct subsurface boundary between high and low amplitude components of the second reflection strength traces as being the top-of-geopressure surface for the region of exploration.

14. The method for petroleum or natural gas exploration according to claim 13, wherein the reflection seismic traces for the region of exploration comprise stacked and migrated relative amplitude seismic traces.

15. The method for petroleum or natural gas exploration according to claim 13, wherein the step of analyzing the second reflection strength traces comprises:
   analyzing the second reflection strength traces in record sections, including locating an uppermost distinct subsurface boundary between high and low amplitude components of the second reflection strength traces across each record section;
   identifying the uppermost distinct subsurface boundary between high and low amplitude components of the second reflection strength traces in each record section as being the top-of-geopressure profile for the record section; and
   using the top-of-geopressure profile identified in each record section to derive a top-of-geopressure surface for the region of exploration.

16. The method for petroleum or natural gas exploration according to claim 15, wherein the step of analyzing the second reflection strength traces by record section comprises:
   displaying the second reflection strength traces in record section format with the amplitudes thereof coded in two states of contrast;
   selecting an amplitude threshold for coding the amplitudes of the second reflection strength traces in the two states of contrast to produce a distinct visual uppermost boundary between the amplitude components of the second reflection strength traces represented the two states of contrast across each record section display of the second reflection strength traces;
   identifying the distinct visual uppermost boundary between the amplitude components of the second reflection strength traces represented the two levels of contrast across each record section display of the second reflection strength traces as being the top-of-geopressure profile for the record section; and
   using the top-of-geopressure profile identified in each record section display of the second reflection strength traces to derive a display of the top-of-geopressure surface for the region of exploration.

17. The method of petroleum or natural gas exploration according to claim 16, wherein the second reflection strength traces are displayed in color, and the two states of contrast in which the second reflection strength traces are coded consist of a first and a second color, respectively.

18. An apparatus for determining top-of-geopressure surfaces from reflection seismic traces for a region of geological survey comprising:
   means for storing the reflection seismic traces for the region of geological survey;
   means for performing complex trace analysis on the seismic traces to derive first reflection strength traces corresponding to the seismic traces;
   means for performing waveform smoothing on the first reflection strength traces to derive smoothed first reflection strength traces corresponding to the seismic traces;
   means for performing complex trace analysis on the smoothed first reflection strength traces to derive second reflection strength traces corresponding to the seismic traces; and
   means for analyzing the second reflection strength traces, including locating an uppermost distinct subsurface boundary between high and low amplitude components of the second reflection strength traces, wherein the uppermost distinct subsurface boundary is identified as being the top-of-geopressure surface for the region of geological survey.

19. The apparatus according to claim 18 further comprising:
   means for storing raw reflection seismic data for the region of geological survey; and
   means for pre-processing the reflection seismic data to derive stacked and migrated relative amplitude seismic traces corresponding to the raw reflection seismic data, and storing the relative amplitude seismic traces in the means for storing reflection seismic traces.

20. An apparatus according to claim 18, wherein the means for analyzing the second reflection strength traces comprises:

means for analyzing the second reflection strength traces in record sections, including locating an uppermost distinct subsurface boundary between high and low amplitude components of the second reflection strength trace across each record section, wherein the uppermost distinct subsurface boundary across each record section is identified as the top-of-geopressure profile for the record section; and means for deriving the top-of-geopressure surface for the region of geological survey based on the uppermost distinct subsurface boundary between high and low amplitude components of the second reflection strength traces across each record section.

21. The apparatus according to claim 20, wherein the means for analyzing the second reflection strength traces by record sections comprises:

means for displaying the second reflection strength traces in record section format with the amplitudes thereof coded in two states of contrast; and means for selecting an amplitude threshold for coding the second reflections strength traces in the two states of contrast to produce a distinct visual uppermost boundary between amplitude components of the second reflection strength traces represented by the two states of contrast across each record section display of the second reflection strength traces, wherein the distinct visual boundary in each record section display of the second reflection strength traces is identified as being the top-of-geopressure profile for the record section.

22. The apparatus according to claim 18, wherein the means for performing waveform smoothing on the first reflection strength traces comprises window smoothing.

23. The apparatus according to claim 21, wherein the means for displaying the second reflection strength traces comprises a color display, and the two levels of contrast in which the amplitudes of the second reflection strength are coded consists of a first and a second color, respectively.

* * * * *

UNITED STATES PATENT AND TRADEMARK OFFICE
CERTIFICATE OF CORRECTION

PATENT NO. : 5,311,484
DATED : May 10, 1994
INVENTOR(S) : Roger N. Anderson et al.

It is certified that error appears in the above-indentified patent and that said Letters Patent is hereby corrected as shown below:

Title page, Item 56, 8th line, "sheriff" should read -- Sheriff --. Second page, first column, 11th from-the-bottom line, "Form" should read -- from --; first column, 8th from-the-bottom line, "Tract" should read -- Trace --; second column, 9th line, "Tract" should read -- Trace --; second column, 5th from-the-bottom line, "Gophys" should read -- Geophys. --. Col. 2, line 55, "a ong" should read -- along --. Col. 4, line 68, "power" should read -- the power --. Col. 5, line 18, "shows and" should read -- shows --. Col. 6, line 35, "power" should read -- the power --. Col. 8, line 31, "FIG. 5" should read -- FIG. 5A --. Col. 9, line 13, "FIG. 6" should read -- FIG. 6A --.

Signed and Sealed this

Ninth Day of January, 1996

Attest:

BRUCE LEHMAN

*Attesting Officer*  *Commissioner of Patents and Trademarks*